(12) United States Patent
George et al.

(10) Patent No.: US 8,798,670 B2
(45) Date of Patent: Aug. 5, 2014

(54) MOBILE WIRELESS COMMUNICATIONS DEVICE WITH DDPDT RF SWITCH AND RELATED METHODS

(75) Inventors: Liviu George, Waterloo (CA); Christopher Robert Little, Kitchener (CA); Simon Andrew Hughes, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 183 days.

(21) Appl. No.: 13/565,904

(22) Filed: Aug. 3, 2012

(65) Prior Publication Data

US 2014/0038663 A1    Feb. 6, 2014

(51) Int. Cl.
*H04M 1/00*    (2006.01)

(52) U.S. Cl.
USPC .................. 455/550.1; 455/132; 455/338

(58) Field of Classification Search
CPC ..... H04B 7/0817; H04B 1/0057; H04B 1/005
USPC ...................... 455/550.1, 132, 338
See application file for complete search history.

(56) References Cited

U.S. PATENT DOCUMENTS

| | | | | |
|---|---|---|---|---|
| 5,214,390 A | * | 5/1993 | Montreuil | 329/309 |
| 5,271,041 A | * | 12/1993 | Montreuil | 375/344 |
| 5,287,351 A | * | 2/1994 | Wall, Jr. | 370/206 |
| 6,002,270 A | * | 12/1999 | Timoc | 326/98 |
| 6,411,824 B1 | * | 6/2002 | Eidson | 455/561 |
| 6,756,552 B2 | * | 6/2004 | Takenaka et al. | 200/224 |
| 7,868,818 B2 | * | 1/2011 | Henderson | 342/175 |
| 7,986,741 B2 | | 7/2011 | Tsai et al. | |
| 8,219,056 B2 | | 7/2012 | Sundstrom et al. | |
| 2006/0126851 A1 | * | 6/2006 | Yuen et al. | 381/1 |
| 2007/0223615 A1 | | 9/2007 | Dosanjh et al. | |
| 2009/0019337 A1 | | 1/2009 | Pi et al. | |
| 2011/0032890 A1 | | 2/2011 | Wu | |
| 2011/0053539 A1 | | 3/2011 | Sundstrom et al. | |
| 2011/0128919 A1 | | 6/2011 | Kim et al. | |
| 2011/0312288 A1 | | 12/2011 | Fu et al. | |
| 2012/0039229 A1 | | 2/2012 | Etemad et al. | |
| 2012/0069766 A1 | | 3/2012 | Fu et al. | |
| 2012/0076077 A1 | | 3/2012 | Buckley et al. | |
| 2012/0082263 A1 | | 4/2012 | Mahalleh et al. | |
| 2012/0083278 A1 | | 4/2012 | Kazmi et al. | |
| 2012/0083284 A1 | | 4/2012 | Harrison et al. | |
| 2013/0083703 A1 | * | 4/2013 | Granger-Jones et al. | 370/277 |
| 2014/0038663 A1 | * | 2/2014 | George et al. | 455/550.1 |

* cited by examiner

*Primary Examiner* — Lewis West
*Assistant Examiner* — Richard Chan
(74) *Attorney, Agent, or Firm* — Allen, Dyer, Doppelt, Milbrath & Gilchrist, P.A.

(57) ABSTRACT

A mobile wireless communications device may include an antenna, primary RF receivers configured to operate at different RF bands, each primary RF receiver having a differential input, and secondary RF receivers also configured to operate at the different RF bands, each secondary RF receiver having a differential input. The mobile wireless communications device may also include first and second RF filters coupled to the antenna and configured to respectively pass first and second RF bands from among the different RF bands, and a first DDPDT RF switch coupled between the first and second RF filters and the differential inputs of respective first ones of the primary and secondary RF receivers.

20 Claims, 4 Drawing Sheets

MOBILE WIRELESS COMMUNICATIONS DEVICE WITH DDPDT RF SWITCH AND RELATED METHODS

TECHNICAL FIELD

This application relates to the field of communications, and more particularly, to mobile wireless communications devices and related methods.

BACKGROUND

Cellular communication systems continue to grow in popularity and have become an integral part of both personal and business communications. Cellular telephones allow users to place and receive phone calls almost anywhere they travel. Moreover, as cellular telephone technology is advanced, so too has the functionality of cellular devices. For example, many cellular devices now incorporate Personal Digital Assistant (PDA) features such as calendars, address books, task lists, calculators, memo and writing programs, etc. These multi-function devices usually allow users to wirelessly send and receive electronic mail (email) messages and access the internet via a cellular network and/or a wireless local area network (WLAN), for example.

Cellular devices have radio frequency (RF) processing circuits and receive or transmit radio communications signals typically using modulation schemes. The typical cellular device may have multiple transmit and receive pathways from the antenna to a digital signal processor (DSP). In particular, each signal pathway may comprise a filter to help isolate the desired frequency band from extraneous electromagnetic signals, for example, noise and interference. Nevertheless, as frequency bands change because of regulatory reasons, expansion, etc. and as more transceivers are added to the cellular device, the likelihood of self-interference may increase.

Figure 1:
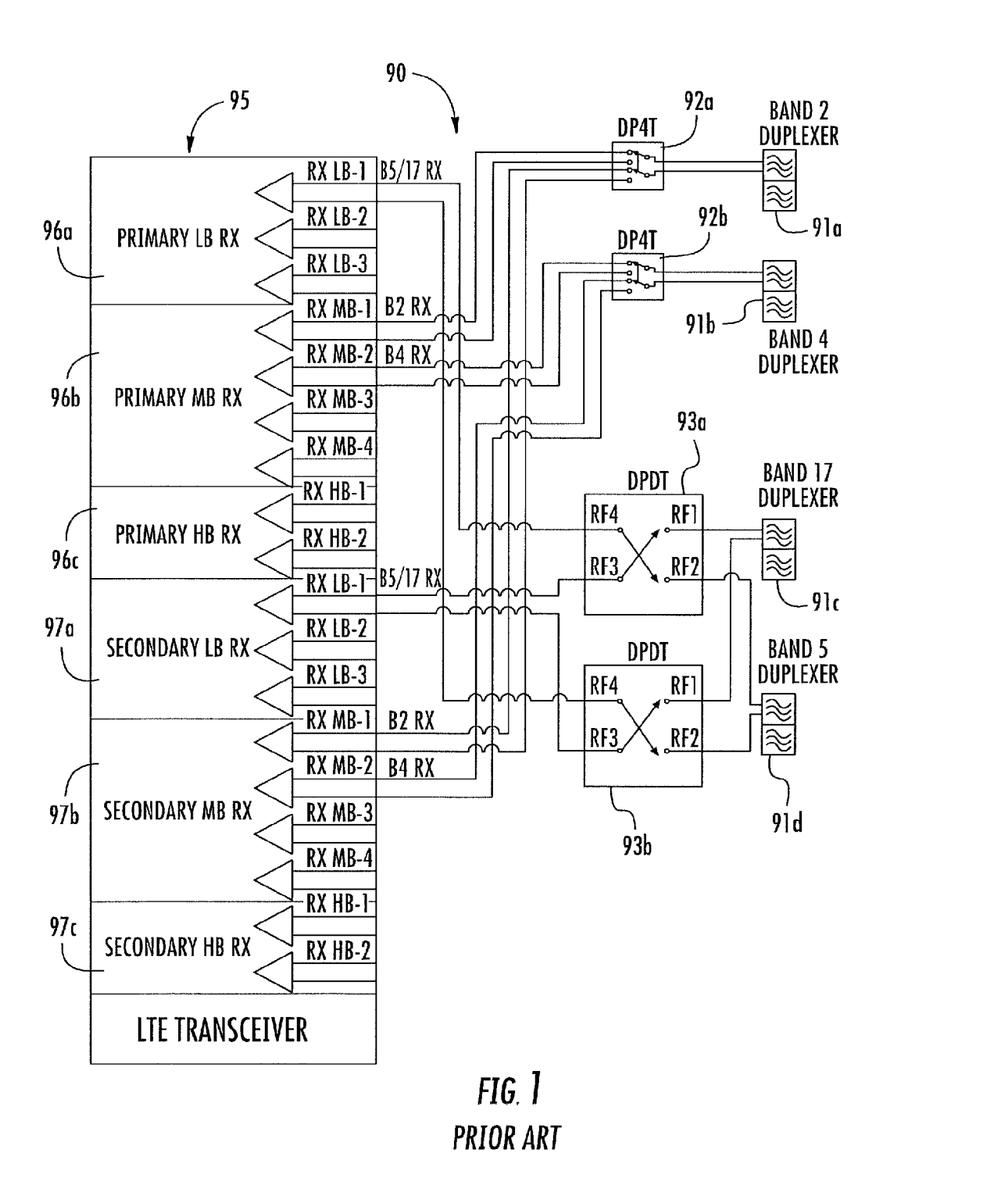
FIG. 1 is a schematic block diagram of a mobile wireless communications device, according to the prior art.

The routing of the pathways from the antenna to the DSP in a fourth generation Long Term Evolution (LTE) device may be problematic, particularly, the RF performance demands in carrier aggregation mode. Referring to FIG. 1, an approach to a receiver device 90 is shown. The receiver device 90 illustratively includes an LTE transceiver 95 comprising a plurality of primary and secondary receivers 96a-96c, 97a-97c. The receiver device 90 illustratively includes a plurality of band pass duplexers 91a-91d for passing the respective bands of the LTE communication standard. The receiver device 90 illustratively includes a pair of double-pole, four throw switches 92a-92b coupled between the band pass duplexers 91a-91b and the LTE transceiver 95, and a pair of double-pole, double-throw switches 93a-93b coupled between the band pass duplexers 91c-91d and the LTE transceiver 95. A potential drawback of this approach is that the front end module of the receiver device 90 is complicated, which adds to difficulty and cost of manufacture. Moreover, as more band capabilities are added, the complexity also increases.

DETAILED DESCRIPTION OF THE PREFERRED EMBODIMENTS

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile wireless communications device may comprise an antenna, a plurality of primary RF receivers configured to operate at a plurality of different RF bands, each primary RF receiver having a differential input, and a plurality of secondary RF receivers also configured to operate at the plurality of different RF bands, each secondary RF receiver having a differential input. The mobile wireless communications device may also include first and second RF filters coupled to the antenna and configured to respectively pass first and second RF bands from among the plurality of different RF bands, and a first differential double-pole, double-throw (DDPDT) RF switch coupled between the first and second RF filters and the differential inputs of respective first ones of the pluralities of primary and secondary RF receivers.

The mobile wireless communications device may further comprise third and fourth RF filters coupled to the antenna and configured to respectively pass third and fourth RF bands from among the plurality of different RF bands, and a second DDPDT RF switch coupled between the third and fourth RF filters and the differential inputs of respective second ones of the pluralities of primary and secondary RF receivers.

More specifically, the mobile wireless communications device may further comprise a controller configured to operate the first and second DDPDT RF switches in a carrier aggregation mode. In some embodiments, the plurality of primary RF receivers and the plurality of secondary RF receivers may each comprise fourth generation LTE RF receivers. For example, the first and second RF bands may respectively comprise LTE Bands 2 and 4, and the third and fourth RF bands may respectively comprise LTE Bands 17 and 5.

Additionally, the plurality of primary RF receivers may comprise a group of low band RF receivers, a group of mid band RF receivers, and a group of high band RF receivers. Similarly, the plurality of secondary RF receivers may comprise a group of low band RF receivers, a group of mid band RF receivers, and a group of high band RF receivers.

The mobile wireless communications device may further comprise a housing containing the antenna, the first and second RF filters, the pluralities of primary and secondary RF receivers, and the first DDPDT RF switch. The mobile wireless communications device may further comprise a respective duplexer associated with each of the first and second RF filters.

Another aspect is directed to a method of using a mobile wireless communications device comprising an antenna, a plurality of primary RF receivers operating at a plurality of different RF bands, each primary RF receiver having a differential input, and a plurality of secondary RF receivers also operating at the plurality of different RF bands, each secondary RF receiver having a differential input. The mobile wireless communications device may also include first and second RF filters coupled to the antenna and respectively passing first and second RF bands from among the plurality of different RF bands. The method may comprise using a first DDPDT RF switch in the mobile wireless communications device coupled between the first and second RF filters and the differential inputs of respective first ones of the pluralities of primary and secondary RF receivers.

Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

Figure 2:
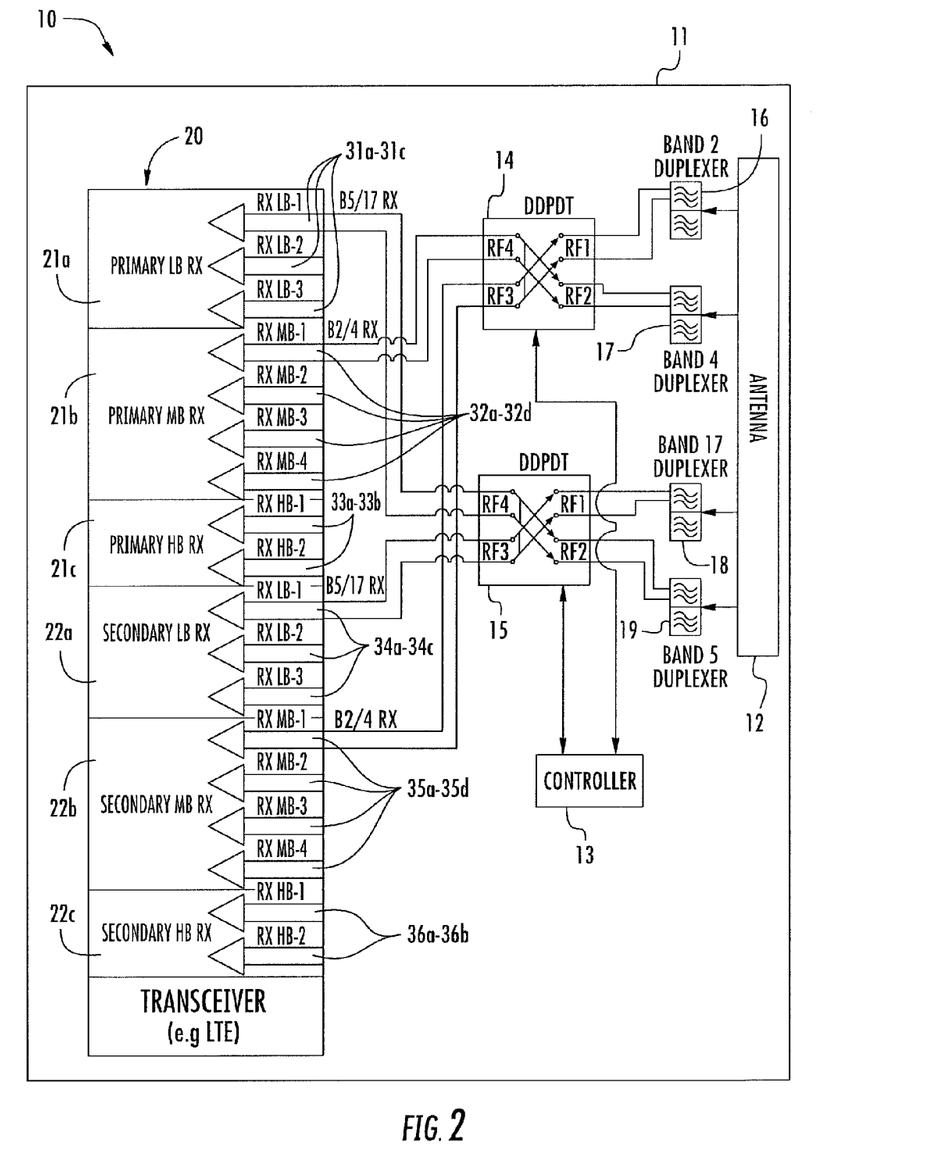
FIG. 2 is a schematic block diagram of an example embodiment of a mobile wireless communications device.

Referring now to FIG. 2, a mobile wireless communications device 10 according to the present disclosure is now described. The mobile wireless communications device 10 illustratively includes an antenna 12, and a transceiver 20 (e.g. LTE) coupled thereto. The transceiver 20 illustratively includes a plurality of primary RF receivers 21a-21c configured to operate at a plurality of different RF bands. More specifically, the primary RF receivers comprise a primary low band receiver 21a, a primary mid band receiver 21b, and a primary high band receiver 21c. The primary low band receiver 21a illustratively includes three differential inputs 31a-31c, the primary mid band receiver 21b illustratively includes four differential inputs 32a-32d, and the primary high band receiver 21c illustratively includes two differential inputs 33a-33b.

The transceiver 20 illustratively includes a plurality of secondary RF receivers 22a-22c, again low band, mid band, and high band, and also configured to operate at the plurality of different RF bands. Similar to the primary RF receivers 21a-21c, each secondary RF receiver includes a corresponding number of differential inputs 34a-34c (low band), 35a-35d (mid band), & 36a-36b (high band).

The mobile wireless communications device 10 illustratively includes first and second RF filters (illustratively shown as band pass duplexer filters) 16-17 coupled to the antenna 12 and configured to respectively pass first and second RF bands from among the plurality of different RF bands, and a first DDPDT RF switch 14 coupled between the first and second RF filters and the first differential inputs 32a, 35a of the mid band primary and secondary RF receivers 21b, 22b. Advantageously, the first DDPDT RF switch 14 efficiently manages routing and switching of signals across multiple bands without the complex routing networks of existing approaches.

The mobile wireless communications device also illustratively includes third and fourth RF filters 18-19 coupled to the antenna 12 and configured to respectively pass third and fourth RF bands from among the plurality of different RF bands, and a second DDPDT RF switch 15 coupled between the third and fourth RF filters and the first differential inputs 31a, 34a of the low band primary and secondary RF receivers 21a, 22a. In the illustrated embodiment, the mobile wireless communications device 10 further comprises a respective duplexer associated with each of the RF filters 16-19, i.e. band pass duplexer filters.

Also, in the illustrated embodiment, the mobile wireless communications device 11 comprises a housing 11 containing the antenna 12, the first, second, third, and fourth RF filters 16-19, the transceiver 20 with the pluralities of primary and secondary RF receivers 21a-21c, 22a-22c, and the first and second DDPDT RF switches 14-15.

In the illustrated embodiment, the mobile wireless communications device 10 includes a controller 13 configured to operate the first and second DDPDT RF switches 14-15 in a carrier aggregation mode. For example, in some embodiments, the primary RF receivers and the secondary RF receivers 21a-21c, 22a-22c may each comprise fourth generation LTE RF receivers. For example, the first and second RF bands may respectively comprise LTE Bands 2 and 4, and the third and fourth RF bands may respectively comprise LTE Bands 17 and 5.

In the illustrated mobile wireless communications device 10, for simplicity, only the primary and secondary RF receivers 21a-21c, 22a-22c are shown. The mobile wireless communications device 10 can also include other receivers, such as a multiple input multiple output (MIMO) receiver, and a diversity receiver. Each receiver path may include a respective DDPDT RF switch, and RF filters, as described herein. Also, in this illustrated embodiment, the swapped bands are exemplary. For example, the low bands (700 MHz-1 GHz) may be swapped since the loss of the RF switches would be minimal and receivers usually have better margins in sensitivity at these frequencies.

Figure 3:
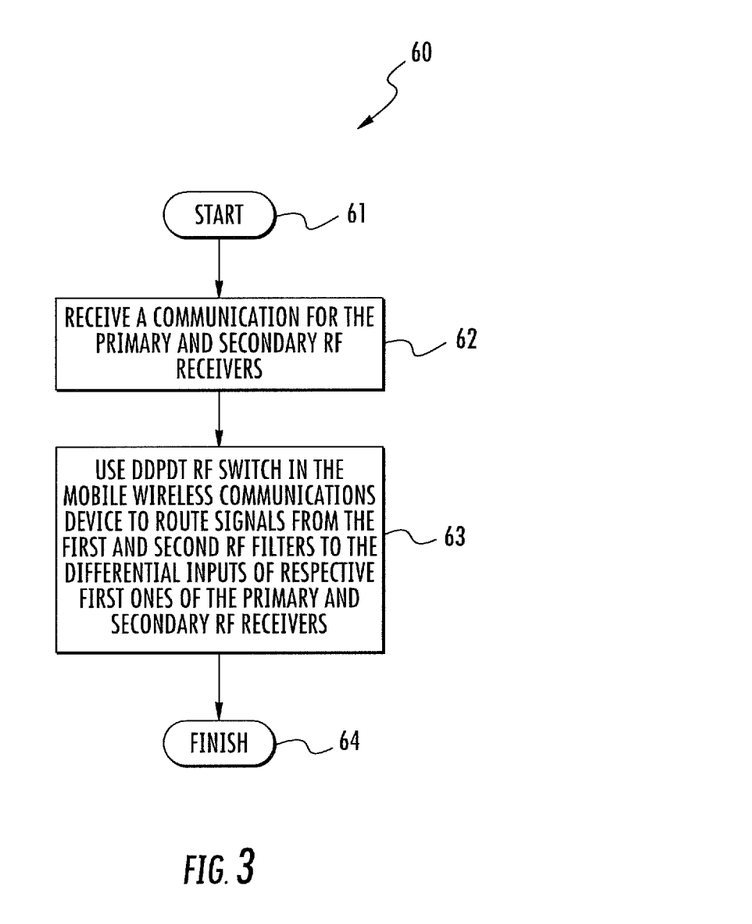
FIG. 3 is a flowchart illustrating operation of the mobile wireless communications device of FIG. 2.

Referring now additionally to FIG. 3, a flowchart 60 illustrates a method of operating the mobile wireless communications device 10 (Block 61). This aspect is directed to a method of using a mobile wireless communications device 10 comprising an antenna 12, a plurality of primary RF receivers 21a-21c operating at a plurality of different RF bands, each primary RF receiver having a differential input 31a-33b, and a plurality of secondary RF receivers 22a-22c also operating at the plurality of different RF bands, each secondary RF receiver having a differential input 34a-36b. The mobile wireless communications device 10 may also include first and second RF filters 16-17 coupled to the antenna 12 and respectively passing first and second RF bands from among the plurality of different RF bands. The method may comprise receiving a communication, and using a first DDPDT RF switch 14 in the mobile wireless communications device 10 coupled between the first and second RF filters 16-17 and the differential inputs 32a, 35a of respective first ones 221, 22b of the pluralities of primary and secondary RF receivers to route the signal (Blocks 62-64).

Advantageously, the mobile wireless communications device 10 described herein provides an approach to issues in the rollout of new LTE Release 10, which may require simultaneous receiving on different frequency bands (carrier aggregation) and may create challenges for user equipment (UE) RF design. For example, one of the issues is the simultaneous receiving in Low Band (LB)+Mid Band (MB) while being able to receive a LB+High Band (HB) and MB+HB band combination (LB stands for any of the LTE Bands 5, 8, 12, 13, 17, 20, MB for 1, 2, 3, 4 and HB for Band 7), as in European 20+3, 20+7 and 3+7 band combinations. Two receivers can accommodate 20+7 and 20+3, but there may a need for special internal or external switching circuitry if the receiver accommodates bands 3+7 on the same receiver. If an internal switch is not available or if the Release 10 approach involves two separate RF integrated circuits (ICs) with differential receiver inputs, there may be an issue with switching signals between the two inputs/RF ICs. These band combinations are listed herein: LTE FDD: 17+2, 17+4, 13+4, MediaFLO+2, 3+7, 20+7, 20+3, 3+5; and 3G: 8+1, 5+1, 5+2, 2+4.

The receive front-end architecture in the mobile wireless communications device 10 may provide an approach to the problems outlined above by replacing two DPDT switches with one differential DPDT (DDPDT). The mobile wireless communications device 10 may provide the following advantages: 1) band coverage for all 2G/3G/LTE band combinations for carrier aggregation (Releases 10 and up); 2) simplified transceiver architecture, requiring fewer RX input ports; and 3) smaller, cheaper and easier to route RF swapping solution for differential signals.

Example components of a mobile wireless communications device 1000 that may be used in accordance with the above-described embodiments are further described below with reference to FIG. 4. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 4:
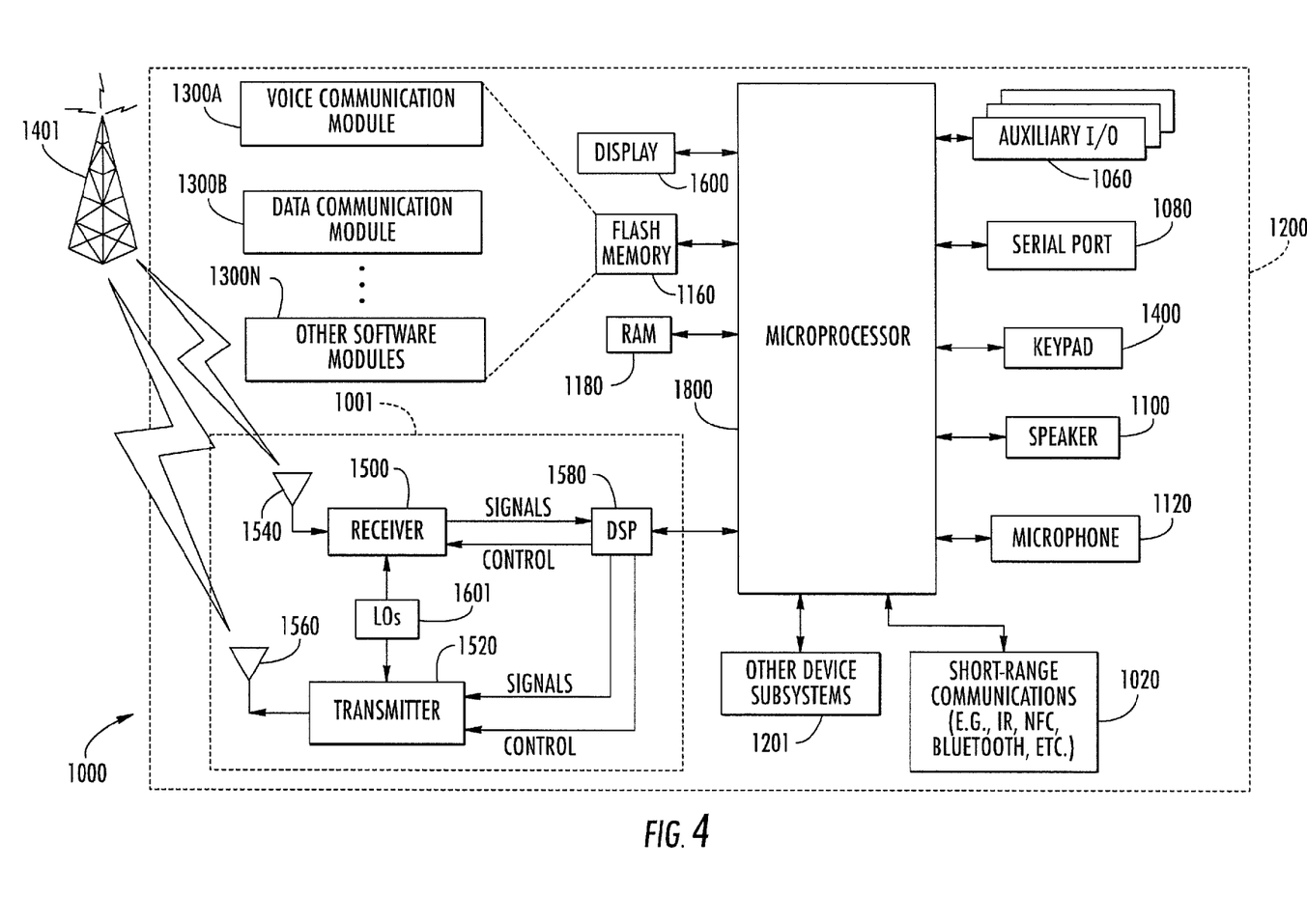
FIG. 4 is a schematic block diagram illustrating example components of a mobile wireless communications device that may be used with the mobile wireless communications device of FIG. 2.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TACT™ or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), GSM (Global System for Mobile Communications), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a NFC sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
   an antenna;
   a plurality of primary radio frequency (RF) receivers configured to operate at a plurality of different RF bands, each primary RF receiver having a differential input;
   a plurality of secondary RF receivers also configured to operate at the plurality of different RF bands, each secondary RF receiver having a differential input;
   first and second RF filters coupled to said antenna and configured to respectively pass first and second RF bands from among the plurality of different RF bands; and
   a first differential double-pole, double-throw (DDPDT) RF switch coupled between said first and second RF filters and the differential inputs of respective first ones of said pluralities of primary and secondary RF receivers.

2. The mobile wireless communications device of claim 1 further comprising:
   third and fourth RF filters coupled to said antenna and configured to respectively pass third and fourth RF bands from among the plurality of different RF bands; and
   a second DDPDT RF switch coupled between said third and fourth RF filters and the differential inputs of respective second ones of said pluralities of primary and secondary RF receivers.

3. The mobile wireless communications device of claim 2 further comprising a controller configured to operate said first and second DDPDT RF switches in a carrier aggregation mode.

4. The mobile wireless communications device of claim 2 wherein said plurality of primary RF receivers and said plurality of secondary RF receivers comprise fourth generation Long Term Evolution (LTE) RF receivers.

5. The mobile wireless communications device of claim 4 wherein said first and second RF bands respectively comprise LTE Bands 2 and 4; and wherein said third and fourth RF bands respectively comprise LTE Bands 17 and 5.

6. The mobile wireless communications device of claim 1 wherein said plurality of primary RF receivers comprises:
   a group of low band RF receivers;
   a group of mid band RF receivers; and
   a group of high band RF receivers.

7. The mobile wireless communications device of claim 1 wherein said plurality of secondary RF receivers comprises:
   a group of low band RF receivers;
   a group of mid band RF receivers; and
   a group of high band RF receivers.

8. The mobile wireless communications device of claim 1 further comprising a housing containing said antenna, said first and second RF filters, said pluralities of primary and secondary RF receivers, and said first DDPDT RF switch.

9. The mobile wireless communications device of claim 1 further comprising a respective duplexer associated with each of said first and second RF filters.

10. A mobile wireless communications device comprising:
    an antenna;
    a plurality of primary radio frequency (RF) receivers configured to operate at a plurality of different RF bands, each primary RF receiver having a differential input;
    a plurality of secondary RF receivers also configured to operate at the plurality of different RF bands, each secondary RF receiver having a differential input;
    first and second RF filters coupled to said antenna and configured to respectively pass first and second RF bands from among the plurality of different RF bands;
    a first differential double-pole, double-throw (DDPDT) RF switch coupled between said first and second RF filters and the differential inputs of respective first ones of said pluralities of primary and secondary RF receivers;
    third and fourth RF filters coupled to said antenna and configured to respectively pass third and fourth RF bands from among the plurality of different RF bands;
    a second DDPDT RF switch coupled between said third and fourth RF filters and the differential inputs of respective second ones of said pluralities of primary and secondary RF receivers; and
    a housing containing said antenna, said first, second, third, and fourth RF filters, said pluralities of primary and secondary RF receivers, and said first and second DDPDT RF switches.

11. The mobile wireless communications device of claim 10 further comprising a controller configured to operate said first and second DDPDT RF switches in a carrier aggregation mode.

12. The mobile wireless communications device of claim 10 wherein said plurality of primary RF receivers and said plurality of secondary RF receivers comprise fourth generation Long Term Evolution (LTE) RF receivers.

13. The mobile wireless communications device of claim 12 wherein said first and second RF bands respectively comprise LTE Bands 2 and 4; and wherein said third and fourth RF bands respectively comprise LTE Bands 17 and 5.

14. The mobile wireless communications device of claim 10 wherein said plurality of primary RF receivers and said plurality of secondary RF receivers each comprises:
    a group of low band RF receivers;
    a group of mid band RF receivers; and
    a group of high band RF receivers.

15. A method of using a mobile wireless communications device comprising an antenna, a plurality of primary radio frequency (RF) receivers operating at a plurality of different RF bands, each primary RF receiver having a differential input, a plurality of secondary RF receivers also operating at the plurality of different RF bands, each secondary RF receiver having a differential input, and first and second RF filters coupled to the antenna and respectively passing first and second RF bands from among the plurality of different RF bands, the method comprising:

using a first differential double-pole, double-throw (DDPDT) RF switch in the mobile wireless communications device coupled between the first and second RF filters and the differential inputs of respective first ones of the pluralities of primary and secondary RF receivers.

16. The method of claim 15 further comprising:
using third and fourth RF filters in the mobile wireless communications device and coupled to the antenna to respectively pass third and fourth RF bands from among the plurality of different RF bands; and
using a second DDPDT RF switch in the mobile wireless communications device and coupled between the third and fourth RF filters and the differential inputs of respective second ones of the pluralities of primary and secondary RF receivers.

17. The method of claim 16 further comprising operating the first and second DDPDT RF switches in a carrier aggregation mode.

18. The method of claim 16 wherein the plurality of primary RE receivers and the plurality of secondary RF receivers comprise fourth generation Long Term Evolution (LTE) RF receivers.

19. The method of claim 18 wherein the first and second RF bands respectively comprise LTE Bands 2 and 4; and wherein the third and fourth RF bands respectively comprise LTE Bands 17 and 5.

20. The method of claim 15 wherein the plurality of primary RF receivers and the plurality of secondary RF receivers each comprises:
a group of low band RF receivers;
a group of mid band RF receivers; and
a group of high band RE receivers.

* * * * *

UNITED STATES PATENT AND TRADEMARK OFFICE
CERTIFICATE OF CORRECTION

| | | |
|---|---|---|
| PATENT NO. | : 8,798,670 B2 | Page 1 of 1 |
| APPLICATION NO. | : 13/565904 | |
| DATED | : August 5, 2014 | |
| INVENTOR(S) | : Liviu George et al. | |

It is certified that error appears in the above-identified patent and that said Letters Patent is hereby corrected as shown below:

In the Claims

Claim 18, Column 9, Line 20          Delete: "RE"
                                     Insert: --RF--

Claim 20, Column 9, Line 32          Delete: "RE"
                                     Insert: --RF--

Signed and Sealed this
Seventh Day of April, 2015

Michelle K. Lee
*Director of the United States Patent and Trademark Office*